Patented May 24, 1938

2,118,117

UNITED STATES PATENT OFFICE 2,118,117

METHOD FOR SEPARATING CONSTITUENTS OF BIOLOGICALLY VALUABLE STARTING MATERIALS

Manasseh Giragos Sevag, Berlin, Germany

No Drawing. Application May 24, 1935, Serial No. 23,337. In Germany May 26, 1934

14 Claims. (Cl. 167—74)

This invention relates to a method for separating biologically valuable constituents from starting materials of vegetable or animal origin.

In prior processes the separation of the constituents of vegetable or animal starting materials from each other has usually been achieved by chemical means. Thus, for instance, proteins have been isolated from such starting materials by precipitation with compounds of heavy metals, acids, alkalies, alcohols and the like. But when proceeding in such a manner, very often injurious changes of the materials can not always be avoided. Likewise the known physical methods, such as boiling and the like, cause similar injurious changes. Although it is possible to isolate enzymes, such as katalase, by means of adsorption from their starting materials, this process is very troublesome and is not adaptable to plant or commercial operation. Furthermore, only a very low yield is obtained thereby.

The present invention is based upon the discovery that vegetable and animal material containing proteins and biologically valuable substances, may be treated in such a manner as to remove said proteins without damage to or destruction of said valuable substances. The treatment contemplated herein includes the separation of the proteins by means of water and water-immiscible substances, whereby a protein gel is formed, which is readily separated from the other substances, rendering them substantially protein free. The water-immiscible substances are those which are capable of forming gels with water soluble proteins in the presence of water. Gel formation may take place by mere contact but for practical purposes it is necessary to shake the starting materials, water and the organic substances sufficiently vigorously to form an emulsion containing the proteins. The more thorough the shaking the more complete is the separation of the proteins from the other constituents. Such organic water immiscible solvents on being mixed and shaken with aqueous solutions containing protein, carbohydrates, etc. combines with the protein alone probably forming a molecular compound in the form of a gel and gel-like consistency which separates out gradually on standing, or immediately on centrifuging. This process of taking the protein out of a water solution is based on an entirely new mild reaction between the protein and the water immiscible organic liquid. Protein is not dissolved in the organic solvent, hence the present process is not an extraction process, as protein is not soluble in organic solvents.

According to the present invention, it has been found that it is possible to transform said starting materials by suitable physical methods, for instance by treatment thereof at temperatures at or below the freezing point of water (0° C.), by irradiation, by the action of electric energy and by other physical methods, into such form that their constituents may be separated very readily and quantitatively from each other by suitable methods of further treatment.

The separation may be accomplished by treating the product in the presence of water at ordinary temperatures with a substance which is capable of forming a phase surface of contact with water, such as organic water-immiscible liquids. The constituents of the starting materials are thus segregated in the several layers and may be readily separated and recovered.

Among such biologically valuable starting materials of vegetable or animal origin, according to the present application, are for instance, blood, liver and other organs, extracts from said organs, yeast, bacteria, plant cell material, enzymes, ferments and the like.

The process of the present invention may furthermore be used for separating the protein-like hormones, such as insulin, the thyreotropic and the gonadotropic hormone and the like, from the accompanying proteins of the organs from which these hormones are derived.

The following examples illustrate the present invention and set forth several embodiments thereof.

Example 1

Separation of polysaccharides from pneumococci.

Cultures of pneumococci are removed from their nutrient medium, washed and treated with liquid air for a short period of time. Thereupon the frozen mass is allowed to thaw. If necessary, the treatment with liquid air may be repeated once or several times. The thawed product is then suspended in five to ten times its amount of water and is shaken thoroughly with about one third of its volume of chloroform. A larger addition of chloroform is not injurious. Foaming is prevented by the addition of small amounts of a known foam-preventing agent, such as amyl alcohol or the like. After shaking the mixture thoroughly for several hours, it is centrifuged whereby the protein constituents form a gel with chloroform and water and containing the proteins adsorbed therein, settling at the bottom, while the aqueous solution may be evaporated to dryness by means of the drying apparatus of Faust. Or the polysaccharides may be precipitated from their aqueous solution by means of alcohol or acetone.

Thus, the process allows a separation of the polysaccharides present in the pneumococci from the proteins without causing detrimental chemical changes of the original constituents.

I may also work at higher temperatures than those of liquid air, for instance at minus 60° C. when causing aqueous suspensions of the finely divided starting material to rapidly freeze whereupon they are thawed again.

In place of chloroform, other water non-miscible organic liquids, such as carbon tetrachloride, hexachloro ethylene, tetrachloro ethylene, high-boiling mineral oil and other indifferent organic solvents and their mixtures may be used.

*Example 2*

Preparing katalase, blood pigment and lipoids from the blood of sheep.

Defibrinated blood of sheep is centrifuged. The sediment of red blood corpuscles obtained thereby is washed with physiological salt solution and is freed in this manner from the serum constituents. Thereupon the sediment is hemolized by means of distilled water. The lake-like solution is then subjected for a short period of time to the action of liquid air, the solution is thawed and is worked up as described in Example 1. After shaking with chloroform, and on centrifuging three layers are obtained of which the lowest, the chloroform layer, contains the lipoids if present, while the middle layer consists of the red blood pigment and the upper layer of a clear aqueous solution of katalase and other ferments.

Thus, in a simple manner, I have succeeded in separating the katalase completely from the blood pigment and without injuring its activity.

*Example 3*

Preparing katalase, blood pigment and lipoids from the blood of rabbits.

The hemolized blood solution obtained according to Example 2 from the blood of rabbits is first shaken thoroughly for a short period of time with chloroform, whereupon the chloroform mixture is allowed to stand for one or two weeks in an ice box. After thawing to room temperature, it is mixed with about equal amounts of an 1/15 molar phosphate buffer solution of pH 7 to 8 and is centrifuged. Thereby separation takes place readily into three layers as in Example 2, and 98% of the blood pigment present is thus removed. The upper layer which is a clear, aqueous solution is again mixed with chloroform, shaken for 1 to 2 hours, centrifuged and again worked up as described in Example 2. A katalase solution is obtained which is entirely free of the blood pigment. Hence, even at the temperatures of the ice box a separation of the various constituents from each other takes place however, the duration of the separation procedure is longer than at the temperature of liquid air.

As can readily be seen, the process described is capable of many applications. The freezing temperatures as well as the duration of the freezing and the mode of working up may be changed in accordance with the properties of the starting materials used.

*Example 4*

Isolating protein-free carbohydrates from albumins.

115 grams of egg white dried at 37° C. are pulverized and mixed with 100 cc. of water so as to form a paste. This is caused to freeze in liquid air and then is allowed to thaw. The freezing and thawing is repeated twice. The paste treated in this manner is then suspended in 1,500 cc. of distilled water and is shaken for 15 hours with a mixture of 300 cc. of chloroform and 100 cc. of amyl alcohol. Thereupon it is centrifuged and the supernatant liquid is syphoned off. The sediment obtained is again suspended in 1,500 cc. of water and is shaken for 15 hours with the above described mixture of chloroform and amyl alcohol. The supernatant liquid obtained on centrifuging is combined with that part which has been obtained on shaking for the first time. The residue is again treated in the same manner and likewise the water-extract obtained thereby is combined with the two first ones and is evaporated to dryness at 37° C. in a Faust-Heim apparatus. The dry substance is again suspended in 1,500 cc. of water and the suspension is shaken with a mixture of 200 cc. of chloroform and 30 cc. of amyl alcohol for 15 hours. The supernatant liquid obtained on centrifuging is filtered through a Seitz-filter. The filtrate is evaporated to dryness by treating with a current of air at 37° C. The residue is dried for one hour in an oven at 60° C. and is allowed to stand for two days in a drying oven at 37° C. The dry substance is then dissolved in 200 cc. of water, filtered through a Seitz-filter, and the filtrate is evaporated to dryness by means of an air current at 37° C. The dry residue is again dissolved in 150 cc. of water and centrifuged, whereupon the supernatant liquid is gradually added to 600 cc. of 96% alcohol and centrifuged. The residue obtained thereby is dissolved in 150 cc. of water, treated as described above with 600 cc. of 96% alcohol and again centrifuged. The precipitate obtained thereby represents a protein free carbohydrate fraction of the egg white.

The supernatant liquid obtained on centrifuging for the last time yields on standing over night further amounts of a precipitate which is removed by centrifuging. On re-dissolving this precipitate in 150 cc. of water and adding this solution gradually to 450 cc. of 96% ethyl alcohol, there is obtained on centrifuging for 15 minutes, directly after precipitation, a further protein-free carbohydrate fraction. Both fractions possess immunological activity.

*Example 5*

Isolating a protein-free carbohydrate fraction from bacterium proteus.

The washed sediment containing bacteria and obtained from 12 liters of bouillon as culture medium, is treated in a thin layer three times with liquid air, it being allowed to thaw after each treatment. The material treated in this manner is then shaken with a mixture of 150 cc. of water, 50 cc. of chloroform and 30 cc. of amyl alcohol over night in the presence of glass beads, after which it is centrifuged. The sediment obtained is then extracted twice in the same manner as described above, with water. The water extracts obtained are then evaporated to dryness at 37° C. in a Faust-Heim-apparatus. The dry substance is then suspended in a mixture of 150 cc. of water, 30 cc. of chloroform and 10 cc. of amyl alcohol, shaken over night and centrifuged. The supernatant liquid is filtered through a Seitz-filter. The filtrate is evaporated to dryness. The dry residue is then dissolved in the necessary amount of water and treated with four volumes of 96% ethyl alcohol. After standing over night in an ice box it is centrifuged. The sediment obtained thereby contains the carbohydrate fraction and is free of proteins.

*Example 6*

Isolating carbohydrates from dried egg white without previously treating the same with liquid air.

10 grams of dried pulverized egg white are triturated with 10 cc. of water to a thick paste, immediately suspended in a mixture of 200 cc. of water, 60 cc. of chloroform and 20 cc. of amyl alcohol and treated as described in Example 4, until a protein-free solution is obtained. The dry residue of this solution is slightly yellow and yields a positive sugar reaction. The yield is about 0.735 gram, i. e. about 7.35% of the starting material.

*Example 7*

Isolating of immunologically active carbohydrate from fresh egg white.

1100 cc. of fresh egg white are evaporated and dried in a Faust-Heim-apparatus at 37° C. whereupon 115 grams of the dry substance are pulverized and treated as described in Example 4. Thus, a carbohydrate is obtained which shows immunological activity.

While I have described my invention setting forth several specific examples of the operation thereof, said examples are intended to illustrate the broad character of the invention and not to limit the same. Various changes may be made in the mode of operation, the character of the starting materials, the quantities of substances used in the process, the manner in which the physical steps are carried out and in various details of the invention, without departing from the spirit thereof. My invention is, therefore, to be broadly construed and to be limited only by the claims appended hereto.

What I claim is:—

1. A method of separating the constituents of organic materials of vegetable or animal origin and containing biologically valuable products associated with proteins to obtain said products substantially free from proteins which comprises agitating the same with a mixture of water and an organic water-immiscible liquid which is capable of forming a gel with said proteins in the presence of water, to cause separation of constituents thereof in a plurality of layers, one of which contains said biologically valuable products substantially free from proteins and another is a gel of protein with organic water-immiscible liquid, said gel being stable on centrifuging.

2. A method of separating the constituents of organic materials of vegetable or animal origin and containing biologically valuable products associated with proteins to obtain said products substantially free from proteins which comprises agitating the same with a mixture of water and an organic water-immiscible liquid which is capable of forming a gel with said proteins in the presence of water and which is taken from the class consisting of halogenated hydrocarbons and high-boiling mineral oils and mixtures thereof, to cause separation of constituents thereof in a plurality of layers, one of which contains said biologically valuable products substantially free from proteins and another is a gel of protein with organic water-immiscible liquid, said gel being stable on centrifuging.

3. A method of separating the constituents of organic materials of vegetable or animal origin and containing biologically valuable products associated with proteins to obtain said products substantially free from proteins which comprises agitating the same with a mixture of water and an organic water-immiscible liquid which is capable of forming a gel with said proteins in the presence of water in the presence of an agent capable of preventing foaming, to cause separation of constituents thereof in a plurality of layers, one of which contains said biologically valuable products substantially free from proteins and another is a gel of protein with organic water-immiscible liquid, said gel being stable on centrifuging.

4. A method of separating the constituents of organic materials of vegetable or animal origin and containing biologically valuable products associated with proteins to obtain said products substantially free from proteins which comprises subjecting the same to a preliminary treatment at a relatively low temperature to change the physical state of said material and then agitating the same with a mixture of water and an organic water-immiscible liquid which is capable of forming a gel with said proteins in the presence of water, to cause separation of constituents thereof in a plurality of layers, one of which contains said biologically valuable products substantially free from proteins and another is a gel of protein with organic water-immiscible liquid, said gel being stable on centrifuging.

5. A method of separating the constituents of organic materials of vegetable or animal origin and containing biologically valuable products associated with proteins to obtain said products substantially free from proteins which comprises subjecting the same to a preliminary treatment at a relatively low temperature by repeated freezing and thawing to change the physical state of said material and then agitating the same with a mixture of water and an organic water-immiscible liquid which is capable of forming a gel with said proteins in the presence of water, to cause separation of constituents thereof in a plurality of layers, one of which contains said biologically valuable products substantially free from proteins and another is a gel of protein with organic water-immiscible liquid, said gel being stable on centrifuging.

6. A method of separating polysaccharides from bacterial cultures which comprises agitating said cultures containing said polysaccharides associated with proteins to obtain said polysaccharides substantially free from proteins with a mixture of water and an organic water-immiscible liquid which is capable of forming a gel with protein in the presence of water, whereby a plurality of layers are formed, one of said layers containing protein in said gel and said polysaccharides being in aqueous solution in another of said layers.

7. A method of separating polysaccharides from bacterial cultures containing said polysaccharides associated with proteins to obtain said polysaccharides substantially free from proteins which comprises subjecting the same to a preliminary treatment at a relatively low temperature to change the physical state of said material and then agitating said cultures with a mixture of water and an organic water-immiscible liquid which is capable of forming a gel with protein in the presence of water, whereby a plurality of layers are formed, one of said layers containing protein in said gel and said polysaccharides being in aqueous solution in another of said layers.

8. A method of separating polysaccharides from bacterial cultures containing said polysaccharides associated with proteins to obtain said polysaccharides substantially free from proteins of pneumococci which comprises agitating said cultures with a mixture of water and an organic water-immiscible liquid which is capable of forming a gel with protein in the presence of water, whereby a plurality of layers are formed, one of said layers containing protein in said gel and said polysaccharides being in aqueous solution in another of said layers.

9. A method of separating polysaccharides from bacterial cultures of pneumococci which comprises subjecting the same to a preliminary treatment at a relatively low temperature to change the physical state of said material and then agitating said cultures with water and an organic water-immiscible liquid which is capable of forming a gel with protein in the presence of water, whereby a plurality of layers are formed containing protein in said gel and said polysaccharides being in aqueous solution.

10. A method of separating constituents of blood which comprises providing defibrinated blood containing biologically valuable products associated with blood pigment, agitating said blood with a mixture of water and a water-immiscible organic liquid which is capable of forming a gel with proteins in the presence of water, to cause separation of said constituents in a plurality of layers, the aqueous layer containing katalase and other ferments, the organic liquid layer containing lipoids, and the intermediate layer containing blood pigment.

11. A method of separating constituents of blood which comprises providing defibrinated blood containing biologically valuable products associated with blood pigment, subjecting said blood to a low temperature to change the physical state thereof, thawing the same, agitating said blood with a mixture of water and a water-immiscible organic liquid which is capable of forming a gel with proteins in the presence of water, to cause separation of said constituents in a plurality of layers, the aqueous layer containing katalase and other ferments, the organic liquid layer containing lipoids, and the intermediate layer containing blood pigment.

12. A method of separating the constituents of organic materials containing carbohydrates associated with albumens to obtain carbohydrates substantially free from said albumens which comprises agitating said materials with a mixture of water and a water-immiscible organic liquid which is capable of forming a gel with proteins in the presence of water, to cause separation of said constituents in a plurality of layers, the aqueous layer containing said carbohydrates substantially free from albumens and another layer containing said albumens.

13. A method of separating the constituents of organic materials containing carbohydrates associated with albumens to obtain carbohydrates substantially free from said albumens which comprises subjecting said materials to a low temperature to change the physical state thereof, thawing the same, agitating said materials with a mixture of water and a water-immiscible organic liquid which is capable of forming a gel with proteins in the presence of water, to cause separation of said constituents in a plurality of layers, the aqueous layer containing said carbohydrates substantially free from albumens and another layer containing said albumens.

14. A method of separating the constituents of organic materials of vegetable or animal origin and containing biologically valuable products associated with proteins to obtain said products substantially free from proteins which comprises agitating the same with a mixture of water and chloroform, to cause separation of constituents thereof in a plurality of layers, one of which contains said biologically valuable products substantially free from proteins and another is a gel of protein and chloroform, said gel being stable on centrifuging.

MANASSEH GIRAGOS SEVAG.